US012190996B2

(12) United States Patent
Li et al.

(10) Patent No.: US 12,190,996 B2
(45) Date of Patent: Jan. 7, 2025

(54) MEMORY CONTROLLER AND A METHOD FOR CONTROLLING ACCESS TO A MEMORY MODULE

(71) Applicant: MONTAGE TECHNOLOGY CO., LTD., Shanghai (CN)

(72) Inventors: Yi Li, Shanghai (CN); Gang Shan, Shanghai (CN); Guohui Li, Shanghai (CN); Chunhui Zhang, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 817 days.

(21) Appl. No.: 17/326,352

(22) Filed: May 21, 2021

(65) Prior Publication Data

US 2021/0366528 A1 Nov. 25, 2021

(30) Foreign Application Priority Data

May 22, 2020 (CN) .......................... 202010440689.5

(51) Int. Cl.
*G06F 21/00* (2013.01)
*G06F 21/44* (2013.01)
(Continued)

(52) U.S. Cl.
CPC ............... *G11C 8/18* (2013.01); *G06F 21/44* (2013.01); *G11C 7/1057* (2013.01); *G11C 7/1084* (2013.01); *G11C 8/20* (2013.01)

(58) Field of Classification Search
CPC ......... G06F 21/44; G11C 7/1057; G11C 8/18; G11C 8/20
See application file for complete search history.

(56) References Cited

U.S. PATENT DOCUMENTS

2005/0108469 A1* 5/2005 Freeman ................. G06F 13/16
711/105
2011/0009092 A1* 1/2011 Etchegoyen ............ H04L 63/08
455/411

(Continued)

FOREIGN PATENT DOCUMENTS

| CN | 103890852 A | * | 6/2014 | ............... G06F 1/24 |
| CN | 106657052 A |   | 5/2017 | |
| CN | 110007850 A |   | 7/2019 | |

OTHER PUBLICATIONS

First Office Action and Search Report for the counterpart Chinese application 202010440689.5, mailed on Feb. 7, 2024.

*Primary Examiner* — Rodman Alexander Mahmoudi
(74) *Attorney, Agent, or Firm* — Jun He Law Offices P.C; James J. Zhu

(57) ABSTRACT

The application discloses a memory controller coupled between a memory module and a host controller to control access of the host controller to the memory module, comprising a central buffer coupled between the host controller and the memory module. The central buffer is configured to receive a command/address signal from the host controller via a command/address channel and selectively provide the command/address signal to the memory module. The command/address signal has an identity authentication message for identifying a source. The central buffer comprises: a verification module coupled to the command/address channel to receive the command/address signal and the identity authentication message, and configured to determine whether the command/address signal conforms to an authority management rule based on the identity authentication message; and an access control module coupled to the command/address channel to receive the command/address signal and coupled to the verification module to receive the determination result, and configured to process the com- (Continued)

mand/address signal based on the determination result to selectively provide the command/address signal to the memory module.

29 Claims, 6 Drawing Sheets

(51) Int. Cl.
*G11C 7/10* (2006.01)
*G11C 8/18* (2006.01)
*G11C 8/20* (2006.01)

(56) References Cited

U.S. PATENT DOCUMENTS

| 2015/0128240 | A1* | 5/2015 | Richards | H04W 12/068 |
| | | | | 726/7 |
| 2016/0217086 | A1* | 7/2016 | Shan | G06F 21/79 |
| 2018/0095770 | A1* | 4/2018 | Brown | G06F 21/74 |

* cited by examiner

MEMORY CONTROLLER AND A METHOD FOR CONTROLLING ACCESS TO A MEMORY MODULE

FIELD OF THE INVENTION

The present application generally relates to the field of memory technology, and more specifically, to a memory controller and a method for controlling access to a memory module.

BACKGROUND OF THE INVENTION

In a computer system, the memory module provides data access and storage during operation of the central processing unit ("CPU"). However, in existing computer systems, an access of the CPU to a memory module is achieved by sending a signal comprising an access command and an access address. Such signal does not comprise an identity authentication message related to the source of the signal, so it is difficult to control access to a memory module by analyzing the identity source of the access signal.

Therefore, it is necessary to improve the existing computer systems.

SUMMARY OF THE INVENTION

An object of the present application is to provide a memory controller and a method for controlling access to a memory module, so as to improve the control of an access command signal.

In one aspect, the present application provides a memory controller coupled between a memory module and a host controller to control access of the host controller to the memory module. The memory controller comprises a central buffer coupled between the host controller and the memory module, wherein the central buffer is configured to receive a command/address signal from the host controller via a command/address channel and selectively provide the command/address signal to the memory module. The central buffer is further configured to receive an identity authentication message identifying a source of the command/address signal from the host controller. The central buffer comprises a verification module coupled to the command/address channel to receive the command/address signal and the identity authentication message, and configured to determine whether the command/address signal conforms to an authority management rule based on the identity authentication message and generate a determination result; and an access control module coupled to the command/address channel to receive the command/address signal, and coupled to the verification module to receive the determination result generated by the verification module, wherein the access control module is configured to process the command/address signal based on the determination result generated by the verification module to selectively send the command/address signal to the memory module.

In some embodiments, the authority management rule comprises an access command type allowed for the identity authentication message; and/or an access address range of the memory module allowed for the identity authentication message.

In some embodiments, the verification module is further configured to: acquire the access command type allowed for the identity authentication message from the authority management rule based on the identity authentication message corresponding to the command/address signal; compare the access command included in the command/address signal with the allowed access command type; in response to that the access command included in the command/address signal is consistent with the allowed access command type, determine that the command/address signal conforms to the authority management rule; or in response to that the access command included in the command/address signal is inconsistent with the allowed access command type, determine that the command/address signal does not conform to the authority management rule.

In some embodiments, the verification module is further configured to: acquire the access address range allowed for the identity authentication message from the authority management rule based on the identity authentication message corresponding to the command/address signal; compare the access address included in the command/address signal with the allowed access address range; in response to that the access address included in the command/address signal is within the allowed access address range, determine that the command/address signal conforms to the authority management rule; in response to that the access address included in the command/address signal is not within the allowed access address range, determine that the command/address signal does not conform to the authority management rule.

In some embodiments, the verification module is further configured to: acquire the access address range and the access command type allowed for the identity authentication message from the authority management rule based on the identity authentication message corresponding to the command/address signal; compare the access address included in the command/address signal with the allowed access address range; compare the access command included in the command/address signal with the allowed access command type; in response to that the access address included in the command/address signal is within the allowed access address range and the access command included in the command/address signal is consistent with the allowed access command type, determine that the command/address signal conforms to the authority management rule; in response to that the access address included in the command/address signal is not within the allowed access address range or the access command included in the command/address signal is inconsistent with the allowed access command type, determine that the command/address signal does not conform to the authority management rule.

In some embodiments, the access control module is further configured to: in response to that the verification module determines that the command/address signal conforms to the authority management rule, provide the command/address signal to the memory module; in response to that the verification module determines that the command/address signal does not conform to the authority management rule, not provide the command/address signal to the memory module.

In some embodiments, the access control module is configured to: in response to that the verification module determines that the command/address signal conforms to the authority management rule, provide the command/address signal to the memory module; in response to that the verification module determines that the command/address signal does not conform to the authority management rule, convert the command/address signal into an invalid signal.

In some embodiments, the access control module is configured to: in response to that the verification module determines that the command/address signal conforms to the authority management rule, provide the command/address signal to the memory module; in response to that the verification module determines that one or more command/address signals do not conform to the authority management rule, count a number of the one or more command/address signals not conforming to the authority management rule; in response to that the number of the one or more command/address signals not conforming to the authority management rule does not exceed a predetermined number, provide the one or more command/address signals not conforming to the authority management rule to the memory module; and in response to that the number of the one or more command/address signals not conforming to the authority management rule exceeds the predetermined number, not provide subsequent command/address signals determined by the verification module as not conforming to the authority management rule to the memory module or convert the subsequent command/address signals determined by the verification module as not conforming to the authority management rule into invalid signals.

In some embodiments, the verification module comprises: an identification module coupled to the command/address channel to receive the command/address signal and the identity authentication message, the identification module being configured to identify the access command and/or the access address in the command/address signal; a determination module coupled to the identification module to receive the access command and/or access address in the command/address signal and the identity authentication message, the determination module being configured to determine whether the command/address signal conforms to the authority management rule based on the identity authentication message; and a rule module configured to store the authority management rule, the rule module being coupled to the determination module to provide the authority management rule to the determination module. In some embodiments, the verification module further comprises a configuration module coupled to the rule module, wherein the authority management rule can be configured in advance or dynamically via the configuration module. In some embodiments, the configuration module is further configured to receive configuration data from the host controller, so that the configuration module configures the authority management rule with the configuration date.

In some embodiments, the verification module comprises: an identification module coupled to the command/address channel to receive the command/address signal and the identity authentication message, the identification module being configured to identify the access command and/or the access address in the command/address signal; a determination module coupled to the identification module to receive the access command and/or access address in the command/address signal and the identity authentication message, the determination module being configured to determine whether the command/address signal conforms to the authority management rule based on the identity authentication message; and an input channel coupled to the determination module, the input channel being configured to receive the authority management rule from the outside of the central buffer and provide the authority management rule to the determination module.

In some embodiments, the central buffer further comprises an output channel and a warning module, the warning module being configured to send a warning notice to the user via the output channel in response to that the verification module determines that the command/address signal does not conform to the authority management rule. In some embodiments, the verification module comprises the warning module and the output channel.

In some embodiments, the central buffer further comprises a recording module, in response to that the verification module determines that the command/address signal does not conform to the authority management rule, the recording module being configured to record the command/address signal. In some embodiments, the verification module comprises the recording module.

In another aspect, the present application also provides a memory comprising the memory controller of the above-mentioned aspect; the present application further provides a computer system comprising the memory of the above-mentioned aspect.

In yet another aspect, the present application also provides a method for controlling access to a memory module, wherein the method comprises: receiving a command/address signal and a corresponding identity authentication message identifying a source of the command/address signal from the host controller; determining whether the command/address signal conforms to an authority management rule based on the identity authentication message and generating a determination result; processing the command/address signal based on the determination result to selectively send the command/address signal to the memory module.

The foregoing is the summary of the present application, which can be simplified, summarized, and details omitted. Therefore, those skilled in the art should recognize that this part is merely an illustrative example and is not intended to limit the scope of the application in any way. This summary is neither intended to identify the key or essential characteristics of the subject matter sought to be protected nor is it intended to be an adjunct to determining the scope of the subject matter sought to be protected.

BRIEF DESCRIPTION OF THE FIGURES

The foregoing and other features of the present application will be more fully understood from the following description and the appended claims taken in conjunction with the accompanying drawings. It is to be understood that these accompanying drawings merely illustrate certain embodiments in accordance with the present application and should not be considered as limiting the scope of the present application. The present application will be illustrated more clearly and in more detail with the accompanying drawings.

DETAILED DESCRIPTION OF THE INVENTION

The following detailed description refers to the accompanying drawings as a part of the present disclosure. In the figures, similar symbols generally represent similar components unless otherwise stated in the context. The illustrative embodiments described in the detailed description, the accompanying drawings and the claims are not limiting. Other embodiments may be adopted, or modifications may be made without deviation from the spirit and the subject of the disclosure. It can be understood that, the various aspects of the disclosure described and graphically presented herein may be arranged, replaced, combined, divided and designed in many different configurations, and these different configurations are implicitly included in the disclosure.

Figure 1:
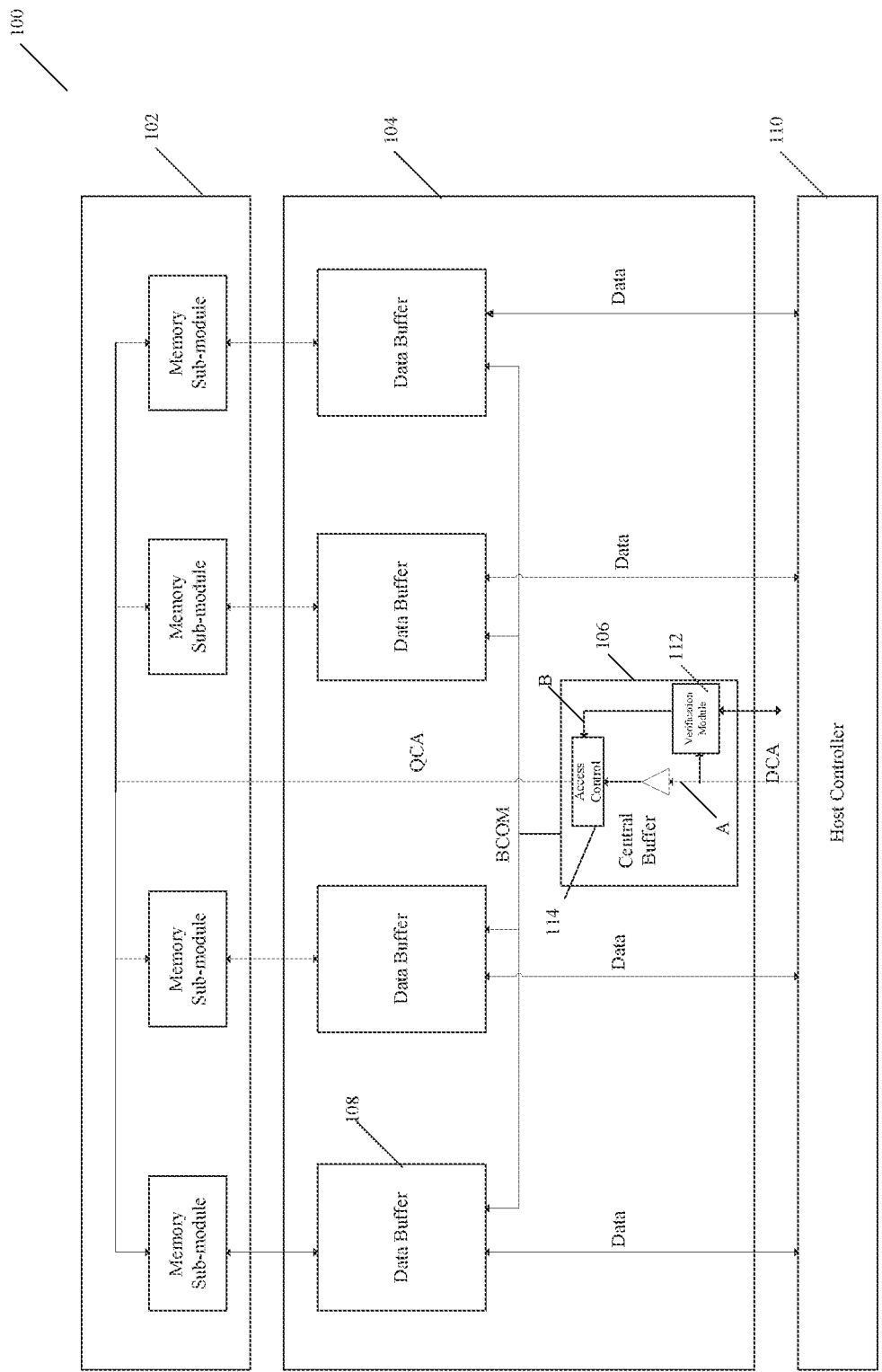
FIG. 1 illustrates a memory system according to an embodiment of the present application.

FIG. 1 illustrates a memory system 100 according to an embodiment of the present application.

As illustrated in FIG. 1, the memory system 100 comprises a memory module 102, which is constructed as a memory module group, for storing data. In some embodiments, the memory module 102 may be a memory module in accordance with the JEDEC Double Data Rate Synchronous Dynamic Random Access Memory (SDRAM) standards including, for example, the JEDEC DDR, DDR2, DDR3, DDR4, DDR5 and other DDR standards. Moreover, the memory module 102 may also be an internal memory module in accordance with other standards or protocols (e.g. the RAMBUS internal memory) and may also be a memory module in accordance with future memory standards or protocols. In some embodiments, the memory module 102 may include a volatile memory (e.g., DRAM), a non-volatile memory (e.g., flash memory, such as NAND or NOR flash memory) or a combination thereof. In other embodiments, the memory module 102 may also be a new type of memory module manufactured through other manufacturing processes, including but not limited to: magneto-resistive memory, phase change memory, resistive memory, semi-floating gate memory, or any other type of memories. It should be noted that the memory system in FIG. 1 is merely an example. In other embodiments, the memory module may comprise only one memory bank or each memory bank may comprise more than two memory blocks, and the number of memory blocks in each memory bank may be the same or different from each other. Moreover, it should be noted that the memory module 102 described herein may be a memory die, or may include two or more memory dies.

Moreover, the structure of the memory array or memory dies included in the memory module 102 may be any appropriate interconnection structures. For example, a plurality of memory dies may form a memory module in parallel; alternatively, a plurality of memory dies may use a multi-level interconnection structure (e.g., two levels). For example, one or more memory dies are used for the first level storage, and the other one or more memory dies are used for the second level storage, so as to provide different levels of storage. The second storage level which is the lower level can exchange data with exterior of the memory module through the first storage level.

As illustrated in FIG. 1, the memory system 100 further includes a memory controller 104 which includes a central buffer 106. Specifically, the central buffer 106 is coupled between a host controller 110 and the memory module 102, and can receive a command/address (C/A) signal which includes an access command and an access address from the host controller 110. For example, the C/A signal may include a data storage address (i.e., the access address) in the memory module 102 and a command for accessing to (e.g., reading from or writing into) such access address. Further, the central buffer 106 can provide the received C/A signal to the memory module 102 and the memory module 102 can perform a corresponding data accessing operation according to the C/A signal. For the memory system in accordance with the DDR3 or DDR4 standard, the central buffer 106 may be integrated into a registering clock driver (RCD). The central buffer 106 is coupled between the host controller 110 and the memory module 102 via a C/A channel, so as to receive the C/A signal from the host controller 110 and provide the received C/A signal to the memory module 102. For the memory system in accordance with the DDR4 standard, the C/A channel may include pins A0-A17, pins BG0-BG1 and/or pins BA0-BA1. The pins BG0-BG1 are used to determine which memory bank group in the memory module 102 is to be accessed, e.g. being written into or being read from; the pins BA0-BA1 are used to determine which memory bank in the memory module is to be accessed; and the pins A0-A17 are used for addressing and determining which memory block in the memory bank is to be accessed. Moreover, inputs to the four pins A16 (RAS_n), A15 (CAS_n), A14 (WE_n) and ACT_n are used for determining the input data access command, such as a read command, a write command or another predefined control command.

The memory controller 104 further includes data buffers (DB) 108. The data buffers 108 are coupled between the memory module 102 and the host controller 110, and are used for exchanging data between the memory module 102 and the host controller 110 under the control of the central buffer 106. The central buffer 106 can provide the C/A signal to the data buffers 108, and the data buffers 108 can control the data exchange between the host controller 110 and the memory block to be accessed in the memory module 102 based on the received C/A signal.

The C/A signal sent by the host controller 110 has a corresponding source, that is, it should be a signal or a command sent by a specific process or program according to practical needs of data processing. In one embodiment, the computer system can execute multiple processes, such as Process 1, Process 2, Process 3 ... Process n, and a C/A signal can be sent by a specific process (for example, Process 3) to write data to or read data from a specific memory address. In another embodiment, for a computer system, it can execute processes or programs related to multiple users, such as User 1, User 2, User 3 ... User n, and a C/A signal can be a signal sent by a process or program logged in by a specific user (for example, User 3), that is, the source of the C/A signal is the process or program related to such specific user. Accordingly, when sending a C/A signal, the host controller 110 also sends an identity authentication message identifying the source of the C/A signal. In some embodiments, the host controller 110 can send an identity authentication message identifying the process source of a C/A signal, such as a process ID (for example, PID) when sending the C/A signal. In other embodiments, the host controller 110 can send an identity authentication message identifying the user source of a C/A signal, such as the ID of the user, when sending the C/A signal. In still other embodiments, the C/A signal can also be identified with other types of sources. For example, C/A signals can be sent from different CPU cores, and the host controller 110 can send an identity authentication message identifying the CPU core when sending each C/A signal. It can be understood that one or more types of the identity authentication messages mentioned above can be sent together with the C/A signal.

The central buffer 106 comprises a main signal path A coupled between the receiving side (DCA side) and the output side (QCA side) of the C/A channel and a branch signal path B coupled to the main signal path A. A verification module 112 is coupled to the branch signal path B, and an access control module 114 is coupled to the main signal path A. Also, the access control module 114 is coupled to the verification module 112 to receive a determination result generated by the verification module 112 on whether each C/A signal conforms to an authority management rule (described in detail below).

For the branch signal path B of the central buffer 106, the verification module 112 coupled to the main signal path A of the C/A channel to receive C/A signals transmitted on the C/A channel and identity authentication messages sent from the host controller 110 as mentioned above for identifying the source of each C/A signal (such as a process source, an user source, etc.). The verification module 112 can snoop on the C/A signals transmitted on the C/A channel in real time, that is, it can extract the access command and/or the access address included in each C/A signal. In addition, as described in further detail below, the verification module 112 can store the authority management rule or receive the authority management rule from the outside. In some embodiments, the authority management rule can include the access command type and/or the access address ranges in the memory module 102 allowed for each identity authentication message. The verification module 112 can compare the identity authentication message corresponding to a C/A signal as well as the access command and/or access address included in the C/A signal with the authority management rule to determine whether the C/A signal conforms to the authority management rule.

In one embodiment, the memory system 100 is configured to manage each C/A signal according to the process source of each C/A signal. In such an embodiment, when sending a C/A signal, the host controller 110 sends the process identity authentication message corresponding to the C/A signal, such as the process ID. For example, the memory system 100 comprises three processes: Process 1, Process 2, and Process 3. When sending a C/A signal, the host controller 110 also sends a process ID identifying the process source of the C/A signal. In such an embodiment, the authority management rule stored in the verification module 112 or received from the outside includes the access command types allowed for each process, as shown in Table 1 below. When the verification module 112 receives a C/A signal from a specific process, the verification module 112 compares the access command included in the C/A signal with the allowed access command types corresponding to such specific process contained in the authority management rule. For example, referring to the determination of Process 1 in Table 1, if the access command included in a C/A signal from Process 1 is a write command, it conforms to the authority management rule, and the verification module 112 determines that such C/A signal conforms to the authority management rule; in contrast, if the access command included in a C/A signal from Process 1 is a read command, it does not conform to the authority management rule, and the verification module 112 determines that such C/A signal does not conform to the authority management rule. Those skilled in the art can understand that the authority management rule may include no content for a certain process, and the memory system 100 can be configured that if no authority management rule is established for a certain process, such process is allowed to perform any operation or such process is forbidden to perform any operation.

TABLE 1

| C/A Signal | | Authority Management Rule | Determination Result |
|---|---|---|---|
| Process 1 | Perform a write operation to a first memory address | Process 1 is allowed to perform a write operation | Conform |
| | Perform a read operation to a first memory address | | Not Conform |
| Process 2 | Perform a write operation to a second memory address | Process 2 is allowed to perform a read operation | Not Conform |
| | Perform a read operation to a second memory address | | Conform |
| Process 3 | Perform a write operation to a third memory address | Process 3 is allowed to perform any operation | Conform |
| | Perform a read operation to a third memory address | | Conform |

In another embodiment, the memory system 100 manages each C/A signal based on the user source of each C/A signal. In such an embodiment, when sending a C/A signal, the host controller 110 also sends a user identity authentication message corresponding to the C/A signal, such as a user ID. For example, the memory system 100 may include three users: User 1, User 2, and User 3. When the host controller sends a C/A signal, the ID of the user source will be sent together. In one such embodiment, the authority management rule stored in the verification module 112 or received from the outside includes an access address range (for example, the first memory block to the third memory block included in the first memory sub-module in the memory module 102) allowed for each user, as shown in Table 2 below. In response to receiving a C/A signal from a specific user, the verification module 112 compares the access address included in the C/A signal with the allowed access address range corresponding to such specific user in the authority management rule. For example, referring to Table 2 for the C/A signal of User 2, if the access address included in the C/A signal from User 2 falls within the range of "the first memory block to the fifth memory block of the third memory sub-module in the memory module 102", the verification module 112 determines that the C/A signal conforms to the authority management rule; in contrast, if the access address included in the C/A signal from User 2 is not within the address range of "the first memory block to the fifth memory block of the third memory sub-module", it does not conform to the authority management rule, and the verification module 112 determines that the C/A signal does not conform to the authority management rule. Similarly, the authority management rule may include no content for a certain user, and the memory system 100 can be configured that if no authority management rule is established for a certain user, such user is allowed to access any memory address or such user is forbidden to access any memory address. In this embodiment, no authority management rule is established for user 3, which means that user 3 is allowed to access any memory address.

TABLE 2

| C/A Signal | | Authority Management Rule | Determination Result |
|---|---|---|---|
| User 1 | Perform a write operation to the second memory block of the first memory sub-module | User 1 is allowed to access to the first memory block to the third memory block of the first memory sub-module | Conform |
| | Perform a write operation to the fifth memory block of the first memory sub-module | | Not Conform |
| User 2 | Perform a read operation to the fourth memory block of the second memory sub-module | User 2 is allowed to access to the first memory block to the fifth memory block of the third memory sub-module | Not Conform |
| | Perform a read operation to the first memory block of the third memory sub-module | | Conform |
| User 3 | Perform a read operation to the fourth memory block of the fourth memory sub-module | None | Conformity |
| | Perform a read operation to the fourth memory block of the second memory sub-module | | Conformity |

In some embodiments, the authority management rule stored m the verification module 112 or received from the outside can include both the access command type allowed for each identity authentication message and the access address range of the memory module 102 allowed for each identity authentication message. For example, m an embodiment in which the memory system 100 manages each C/A signal based on the process source of each C/A signal, as shown in Table 3 below, the authorization management rule stored in the verification module 102 or received from the outside includes both the access command type and the access address range allowed for each process ID. The verification module 102 can compare both the access command and the access address included in a C/A signal from a certain process with the authority management rule mentioned above. For example, referring to the C/A signal of Process 1 in Table 3, if the access command included in a C/A signal from Process 1 is a read command and the corresponding access address falls within the address range of "the first memory block to the third memory block of the first sub-module", then such C/A signal is determined as conforming to the authority management rule; otherwise, if the access command included in a C/A signal from Process 1 is not a write operation (see the C/A signal of Process 1 in Table 1) or if the access address included in a C/A signal from Process 2 does not fall within the address range of "the first memory block to the fifth memory block of the third memory sub-module" (see the C/A signal of Process 2 in Table 3), then the verification module 112 determines that such C/A signal does not conform to the authority management rule. Similarly, the authority management rule may include no content for a certain process, and the memory system 100 can be configured that if no authority management rule is established for a certain process, such process is allowed to perform any access to any memory address or such process is not allowed to perform any access to any memory address. In this embodiment, no authority management rule is established for Process 3, which means that Process 3 is not allowed to perform any access to any memory address.

TABLE 3

| C/A Signal | | Authority Management Rule | Determination Result |
|---|---|---|---|
| Process 1 | Perform a write operation to the second memory block of the first memory sub-module | Process 1 is allowed to perform a write operation to the first memory block to the third memory block of the first memory sub-module | Conform |
| | Perform a read operation to the third memory block of the first memory sub-module | | Not Conform |
| Process 2 | Perform a read operation to the fourth memory block of the second memory sub-module | Process 2 is allowed to perform a read operation to the first memory block to the fifth memory block of the third memory sub-module | Not Conform |
| | Perform a read operation to the first memory block of the third memory sub-module | | Conform |
| Process 3 | Perform a read operation to the fourth memory block of the fourth memory sub-module | None | Not Conform |
| | Perform a read operation to the fourth memory block of the second memory sub-module | | Not Conform |

Those skilled in the art can understand that the memory system 100 can control each C/A signal based on different types of sources of each C/A signal. For example, in some embodiments, the memory system 100 can also manage each C/A signal based on the CPU core that sends each C/A signal. In addition, in some embodiments, the memory system 100 can manage each C/A signal based on multiple different types of sources of the C/A signal. For example, the memory system 100 can manage each C/A signal based on both the process source and user source of each C/A signal, and the host controller 110 can send identity authentication messages identifying both the process source and the user source of a C/A signal when sending the C/A signal (for example, sending both the process ID and user ID of the C/A) and correspondingly, the authority management rule can include the access command type and/or access address range allowed for the corresponding process source and the user source.

For the main signal path A of the central buffer 106, the access control module 114 receives a C/A signal from the host controller 110 via the main signal path A and is coupled to the verification module 112 to receive a determination result generated by the verification module 112 on whether the C/A signal conforms to the authority management rule. Based on the determination result received from the verification module 112, the access control module 114 may process the C/A signal accordingly to selectively provide the C/A signal to the memory module 102.

In one embodiment, the access control module 114 directly provides the C/A signal that the verification module 112 determines as conforming to the authority management rule to the memory module 102. For a C/A signal that the verification module 112 determines as not conforming to the authority management rule, the access control module 114 blocks such C/A signal, that is, such C/A signal will not be sent to the memory module 102.

In another embodiment, the access control module 114 directly provides the C/A signal that the verification module 112 determines as conforming to the authority management rule to the memory module 102. For a C/A signal that the verification module 112 determines as not conforming to the authority management rule, the access control module 114 converts such C/A signal into an invalid signal, and optionally provides or does not provide the invalid signal to the memory module 102.

In yet another embodiment, for C/A signals that do not conform to the authority management rule, the memory system 100 no longer controls every single C/A signal but chooses to analyze the trend of the C/A signals not conforming to the authority management rule. The access control module 114 can allow a small amount of C/A signals not conforming to the authority management rule to be provided to the memory module 102, and then in response to that the amount of the C/A signals not conforming to the authority management rule exceeds a certain predetermined value, the access control module 114 sends no more subsequent C/A signals not conforming to the authority management rule to the memory module 102. In such an embodiment, the access control module 114 may include a predetermined value. When the amount of the C/A signals that the verification module 112 determines as not conforming to the authority management rule does not exceed the predetermined value, the access control module 114 still provides subsequent C/A signal not conforming to the authority management rule to the memory module 102. At the same time, the access control module 114 counts the amount of the C/A signals not conforming to the authority management rule. After the amount of the C/A signals that the verification module 112 determines as not conforming to the authority management rule exceeds the predetermined value, the access control module 114 sends no more subsequent C/A signals that the verification module 112 determines as not conforming to the authority management rule to the memory module or these subsequent C/A signals not conforming to the authority management rule are converted into invalid signals.

Optionally, the verification module 112 can exchange data with the outside of the central buffer 106 via input and/or output channels, as described in detail below.

Figure 2:
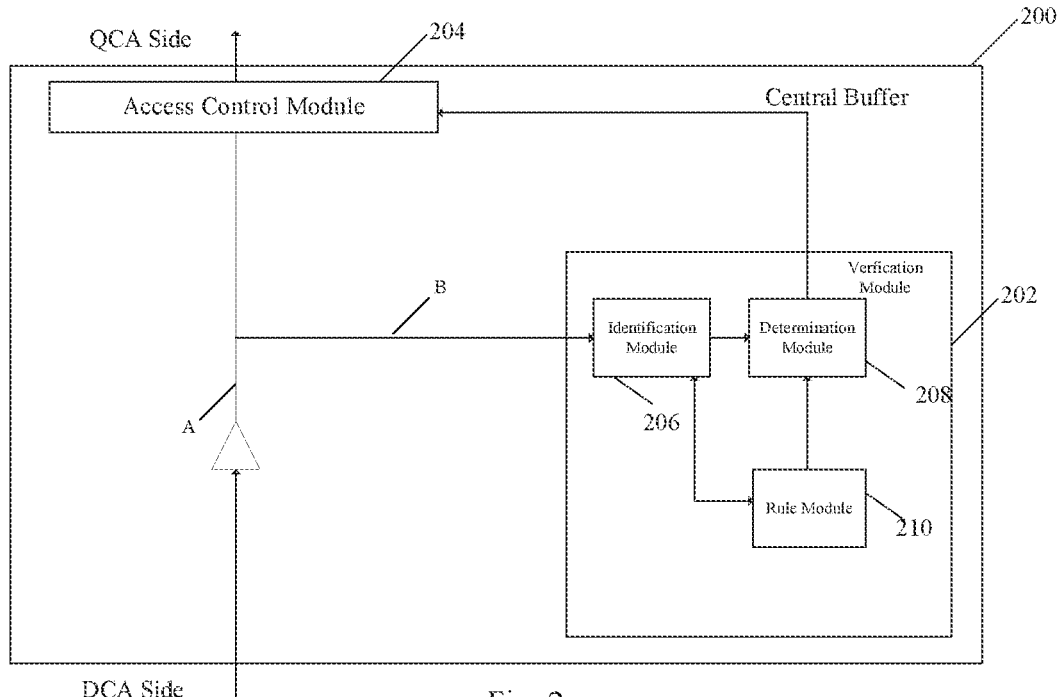
FIG. 2 illustrates a central buffer according to an embodiment of the present application.

FIG. 2 illustrates an exemplary structure of a central buffer 200 according to an embodiment of the present application.

As illustrated in FIG. 2, the central buffer 200 comprises a main signal path A coupled between the receiving side (DCA side) and the output side (QCA side) of the C/A channel and a branch signal path B coupled to the main signal path A. The verification module 202 is coupled to the branch signal path B, and the access control module 204 is coupled to the main signal path A. The access control module 204 is also coupled to the verification module 202 to receive the determination result generated by the verification module 202 on whether each C/A signal conforms to the authority management rule. The verification module 202 and the access control module 204 manage the C/A signals received from the host controller in the manner as mentioned above in conjunction with FIG. 1.

The verification module 202 further comprises an identification module 206. The identification module 206 is coupled to the main signal path A of the C/A channel to receive C/A signals transmitted on the C/A channel. The identification module 206 can snoop on the C/A signals transmitted on the C/A channel in real time, that is, it can extract the access command and/or the access address included in each C/A signal. In some embodiments, for example, as described above in conjunction with Table 1, the authority management rule used by the verification module 202 only include the access command type allowed for each identity authentication message. In such an embodiment, the identification module 206 can only send the access command extracted from the C/A signal to the determination module 208 but not sending the access address, or directly choose to not extract the access address but only extract the access command. In some embodiments, for example, as described above in conjunction with Table 2, the authority management rule used by the verification module 202 only includes the access address range of the memory module allowed for each identity authentication message. In such an embodiment, the identification module 206 can only send the access address extracted from the C/A signal to the determination module 208 but not sending the access command, or directly choose to not extract the access command and only extract the access address. In some embodiments, for example, as described above in conjunction with Table 3, the authority management rule used by the verification module 202 includes both the access command type allowed for each identity authentication message and the access address range allowed for each identity authentication message. In such an embodiment, the identification module 206 may send both the access command and access address extracted from the C/A signal to the determination module 208. The identification module 206 can selectively extract the access command and/or access address of the C/A signal and send the access command and/or access address extracted from the C/A signal to the determination module 208 based on practical needs to determine whether the C/A signal conforms with the authority management rule (as described further below), which is not limited by the present application.

In some embodiments, the identification module 206 can extract the access address and/or access command included in each C/A signal and send the access address and/or access command extracted from each C/A signal to the determination module 208. In other words, the identification module 206 can immediately send the extracted access command and/or access address to the determination module 208 after snooping on each C/A signal. In some embodiments, the identification module 206 can also collectively send the access addresses and/or access commands extracted from multiple C/A signals to the determination module 208 after snooping on a predetermined number of multiple C/A signals. For example, the identification module 206 may collectively send the access addresses and/or access commands extracted from five C/A signals to the determination module 208 after snooping on those five C/A signals, and then collectively send the access addresses and/or access command extracted from next 5 C/A signals to the determination module 208 after snooping on those next 5 C/A signals. Those skilled in the art can understand that the manner in which the identification module 206 snoops on the C/A signals can be flexibly configured based on practical needs (for example, flexibly configuring the number of C/A signals that need to be snooped on before sending access commands and/or access addresses to the determination module 208), which is not limited by the present application.

The identification module 206 also receives the identity authentication message corresponding to each C/A signal from the host controller and sends the identity authentication message to the determination module 208 for subsequent determination. In some embodiments, the identity authentication message corresponding to each C/A signal sent by the host controller is the ID of a certain process (for example, PID). In such an embodiment, the identification module 206 can identify the ID in the signal sent by the host controller, and send the ID to the determination module 208 for subsequent determination. Similarly, for other types of sources of C/A signals (such as user source, host controller core source), the identification module 206 can also identify the corresponding identity authentication message from the signal sent by the host controller, and send the identity authentication message to the determination module 208 for subsequent determination.

The determination module 208 is coupled to the identification module 206 to receive access commands and/or access addresses as well as the corresponding identity authentication messages sent from the identification module 206, and is also coupled to the rule module 210 to accept the authority management rule stored therein. The determination module 208 can compare with the authority management rule based on the received access commands and/or access addresses as well as the corresponding identity authentication messages to determine whether each C/A signal conforms with the authority management rule, for example, as described above in conjunction with Table 1 to Table 3. After generating a determination result, the determination module 208 sends the determination result to the access control module 204 so that the access control module 204 can process the corresponding C/A signals.

The rule module 210 may include a non-volatile storage element, which stores the authority management rule required by the determination module 208 for determination. The rule module 210 is coupled to the determination module 208 to provide the authority management rule. Optionally, the rule module 210 can also be coupled to the identification module 206, so that the identification module 206 can selectively snoop on each C/A signal according to the currently used authority management rule (for example, as described above, selectively extract either the access command or the access address included in each C/A signal, or extract both the access command and access address included in each C/A signal). Optionally, the identification module 206 may also send the extracted access command and access address to the rule module 210, so that the rule module 210 can select an appropriate authority management rule from multiple authority management rules stored therein and provides the selected authority management rule to the determination module 208.

Figure 3:
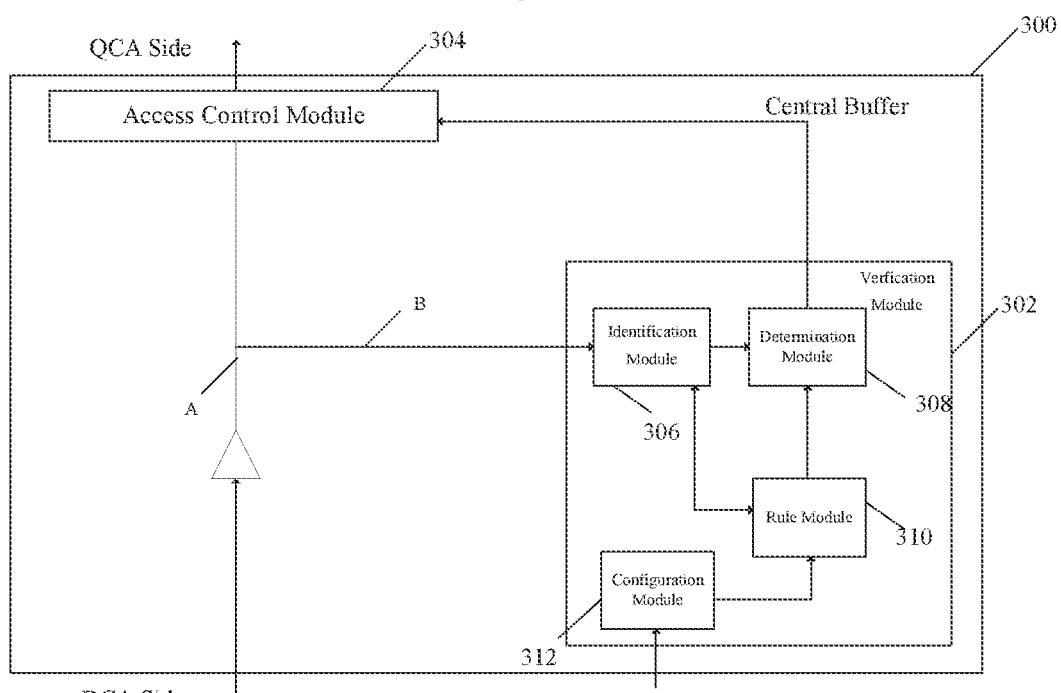
FIG. 3 illustrates a central buffer according to another embodiment of the present application.

FIG. 3 illustrates an exemplary structure of a central buffer 300 according to an embodiment of the present application. The central buffer 300 comprises components generally similar to those of the central buffer 200 as illustrated in FIG. 2, such as a verification module 302 and an access control module 304. The verification module 302 includes an identification module 306, a determination module 308 and a rule module 310, which will not be repeated herein.

The central buffer 300 further includes a configuration module 312 coupled to the rule module 310, so that the authority management rule stored in the rule module 310 can be configured in advance or dynamically. In an embodiment, the authority management rule of the rule module 310 can be pre-configured, that is, the authority management rule stored in the rule module 310 are configured before the operation of the entire memory system (such as the memory system 100 as illustrated in FIG. 1). In another embodiment, the authority management rule of the rule module 310 can be dynamically configured, that is, the authority management rule of the rule module 310 are dynamically configured according to the operating conditions during the operation of the entire memory system (such as the memory system 100 as illustrated in FIG. 1).

In some embodiments, the configuration module 312 can be coupled to the host controller (for example, the host controller 110 as illustrated in FIG. 1), so that the user can send configuration data to the configuration module 312 via the host controller to configure the authority management rule. In some embodiments, the configuration module 312 can be coupled to an external controller (not shown in FIG. 3; the external controller may include, for example, another computer, mobile phone, tablet, or etc. used by the user to analyze access history information, which is not limited by the present application), and the configuration data can be sent to the configuration module 312 via the external controller to configure the authority management rule.

In some embodiments, the configuration module 312 can store multiple sets of configuration data used to configure the authority management rule of the rule module 310, and the configuration module 310 can be coupled to the host controller (for example, the host controller 110 as illustrated in FIG. 1) or an external controller as described above to receive a configuration instruction. The configuration instruction can select one set of predetermined configuration data from the stored multiple sets of predetermined configuration data to configure the authority management rule of the rule module 310.

In some embodiments, the configuration module 312 can automatically configure the authority management rule of the rule module 310. In an embodiment, the configuration module 312 may store multiple sets of predetermined configuration data used to configure the authority management rule of the rule module 310, and the configuration module 312 can also store different conditions for applying each set of predetermined configuration data. During the operation of the memory system (for example, the memory system 100 as illustrated in FIG. 1), the configuration module 312 can automatically apply different sets of predetermined configuration data when different conditions are satisfied, so as to automatically and dynamically configure the authority management rule. For example, the configuration module 310 may include three sets of predetermined configuration data for Process 1, wherein the predetermined configuration data A does not limit any C/A signal from Process 1, the predetermined configuration data B forbids write commands from Process 1, and the predetermined configuration data C forbids both the write commands and read commands from Process 1. The configuration module 312 may apply the predetermined configuration data A at the beginning. In response to that the frequency or times that Process 1 accesses the memory module exceeds a certain threshold (for example, accesses five times in one minute), the different (for example, stricter) predetermined configuration data B is applied. After the times or frequency that the C/A signals from Process 1 violate the predetermined configuration data B exceeds a predetermined value, the different (for example, the strictest) predetermined configuration data C is applied. In other words, the configuration module 310 can adjust the configuration data applied to a process according to the historical access condition of the C/A signals from that process.

Figure 4:
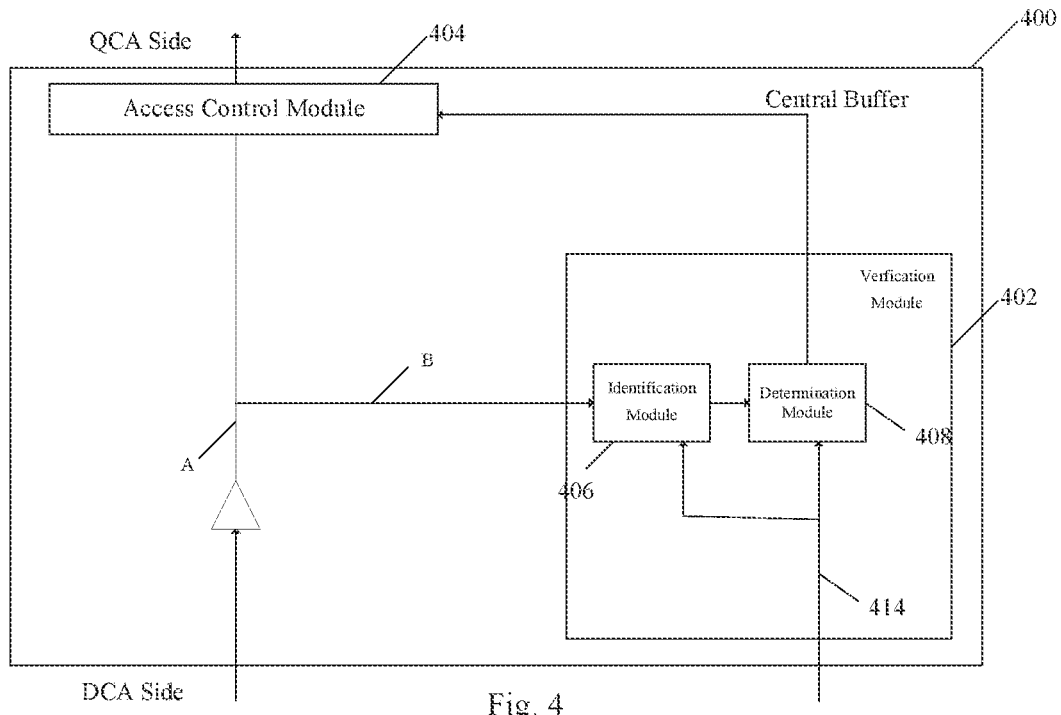
FIG. 4 illustrates a central buffer according to another embodiment of the present application.

FIG. 4 illustrates an exemplary structure of a central buffer 400 according to an embodiment of the present application. The central buffer 400 comprises components generally similar to those of central buffer 200 as illustrated in FIG. 2, such as a verification module 402 and an access control module 404. The verification module 402 includes an identification module 406 and a determination module 408, which will not be repeated herein.

The difference is that the central buffer 400 does not include a rule module, but it includes an input channel 414. The input channel 414 is coupled to the determination module 408 to provide the authority management rule received from the outside of the central buffer 400. In some embodiments, the input channel 414 can be coupled to the host controller (for example, the host controller 110 as described in FIG. 1), so that the authority management rule can be provided to the determination module 408 via the host controller. In some embodiments, the input channel 414 can be coupled to an external controller (not illustrated in FIG. 4; the external controller can include, for example, another computer, mobile phone, tablet, or etc. used by the user to analyze access history information, which is not limited by the present application), so that the authority management rule can be provided to the determination module 408 via the external controller. Optionally, the input channel 414 can also be coupled to the identification module 406 so that the identification module 406 can selectively snoop on each C/A signal according to the current used authority management rule (for example, as described above, one of the access command and the access address included in the C/A signal is selectively extracted, or both the access command and the access address are extracted).

Figure 5:
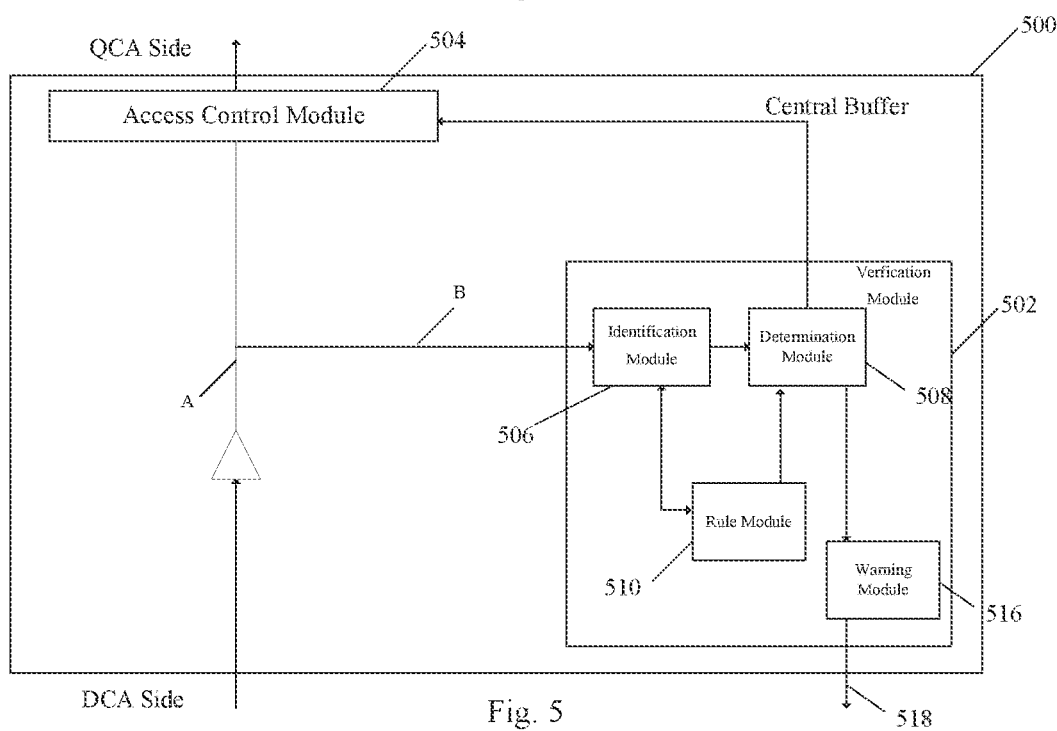
FIG. 5 illustrates a central buffer according to another embodiment of the present application.

FIG. 5 illustrates an exemplary structure of a central buffer 500 according to an embodiment of the present application. The central buffer 500 comprises components generally similar to those of the central buffer 200 as illustrated in FIG. 2, for example, a verification module 502 and an access control module 504. The verification module 502 includes an identification module 506, a determination module 508 and a rule module 510, which will not be repeated herein.

The central buffer 500 further comprises a warning module 516 and an output channel 518. The warning module 516 is coupled to the determination module 508 to receive the determination result generated by the determination module 508 on whether each C/A signal conforms to the authority management rule. The warning module 516 may send a warning notice via the output channel 518 in response to that a C/A signal does not conform to the authority management rule. The output channel 518 may be coupled to the host controller or another external controller (not shown in FIG. 5; the external controller can include, for example, another computer, mobile phone, tablet, or etc. used by the user to analyze access history information, which is not limited by the present application) to send a warning notice that a C/A signal does not conform to the authority management rule. In some embodiments, the output channel 518 may be a high-speed channel, such as a PCIe channel, a CXL channel or a Wireless channel, which is suitable for high-speed output of information to increase the speed of sending warning notices. In some embodiments, the output channel 518 can also be a SMBus channel (using $I^2C$ protocol or a similar protocol), a DCA channel (constructed as a two-way communication path between the host controller and the central buffer) or etc.

Those skilled in the art can understand that the warning module 516 may not be included in the verification module 502, but is configured as a separate module coupled to the verification module 502. In this way, a separate warning module can be coupled to the determination module included in the verification module and coupled to the host controller or another external controller via the output channel to send a warning notice that a C/A signal does not conform to the authority management rule. The present application does not limit this.

In addition, those skilled in the art can understand that in an embodiment where the central buffer includes a warning module and an output channel (for example, the central buffer 500 as illustrated in FIG. 5), when the verification module determines that a C/A signal does not conform to the authority management rule, the central buffer can only send a warning notice that the C/A signal does not conform to the authority management rule via the warning module and the output channel without processing the C/A signal not conforming to the authority management rule (for example, not blocking the C/A signal, not converting the C/A signal into an invalid signal, etc.). That is, the memory module can still receive the C/A signal not conforming to the authority management rule. In such an embodiment, the central buffer does not automatically process the C/A signal not conforming to the authority management rule, but only sends a warning notice to the user.

Figure 6:
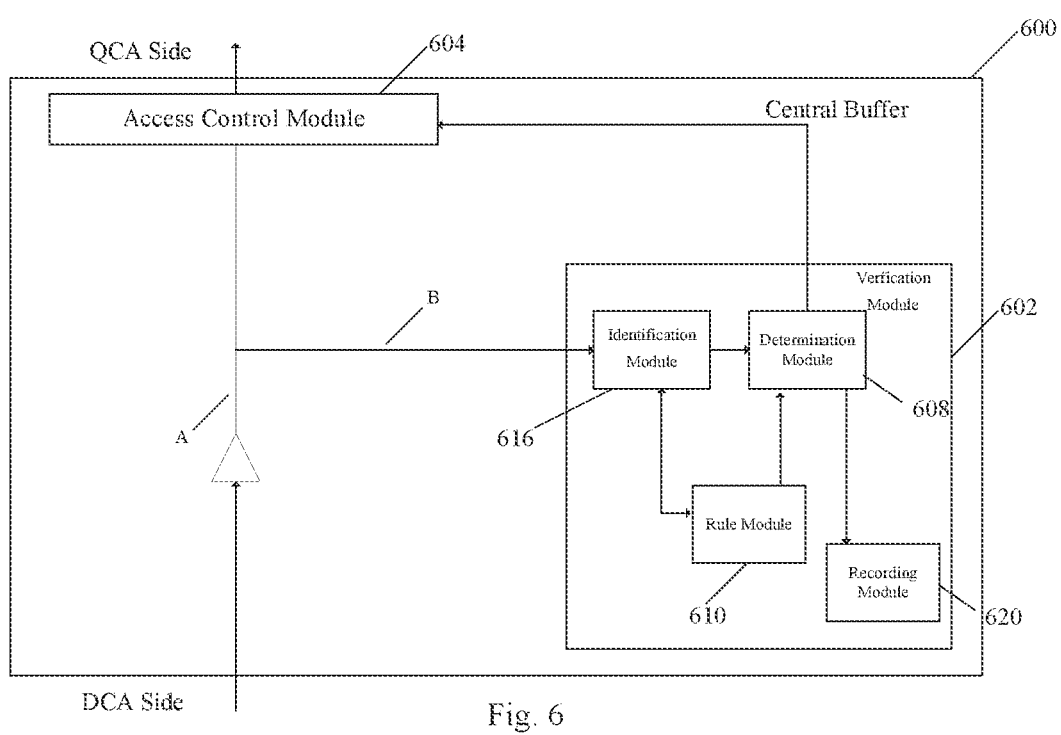
FIG. 6 illustrates a central buffer according to another embodiment of the present application.

FIG. 6 illustrates an exemplary structure of a central buffer 600 according to an embodiment of the present application. The central buffer 600 comprises components generally similar to those of the central buffer 200 as illustrated in FIG. 2, such as a verification module 602 and an access control module 604. The verification module 602 includes an identification module 606, a determination module 608 and a rule module 610, which will not be repeated herein.

The central buffer 600 further comprises a recording module 620. The recording module 620 is coupled to the determination module 608 to record a C/A signal in response to that the determination module 608 determines that such C/A signal does not conform to the authority management rule, for subsequent analysis. In some embodiments, rules that the recording module 620 uses for recording C/A signals not conforming to the authority management rule can be configured. For example, in some embodiments, for example, it is more desirable to determine which process or user has performed illegal write operations on the memory module. The recording module 620 may be configured to only record C/A signals that violate write-related authorization management rule, so as to save memory space. In some embodiments, for example, it is only desired to determine which memory address that the operation commends violating the authorization management rule are directed to, and the recording module 620 may only record the access addresses in C/A signals that violate the authority management rule, so as to make the subsequent analysis more concise and clear.

Those skilled in the art can understand that the recording module 620 may not be included in the verification module 602, but is configured as a separate module coupled to the verification module 602. In this way, a separate recording module can be coupled to the determination module included in the verification module to record a C/A signal in response to that the determination module determines that such C/A signal does not conform to the authority management rule.

It should be noted that the circuit arrangements of the central buffers shown in FIG. 2 to FIG. 6 are only exemplary. In practical applications, the circuit arrangements can be modified as needed, for example, combining or cancelling one or more modules of the central buffers shown in FIG. 2 to FIG. 6. For example, in some embodiments, the central buffer may include one or some or all of the rule module (for example, the rule modules 210 and 310 shown in FIG. 2 and FIG. 3), the input channel (for example, the input channel 414 described in FIG. 4), the configuration module (for example, the configuration module 312 described in FIG. 3), the warning module (for example, the warning module 518 described in FIG. 5), the output channel (for example, the output channel 518 described in FIG. 5) and the recording module (for example, the recording module 620 as illustrated in FIG. 6) based on practical needs.

Figure 7:
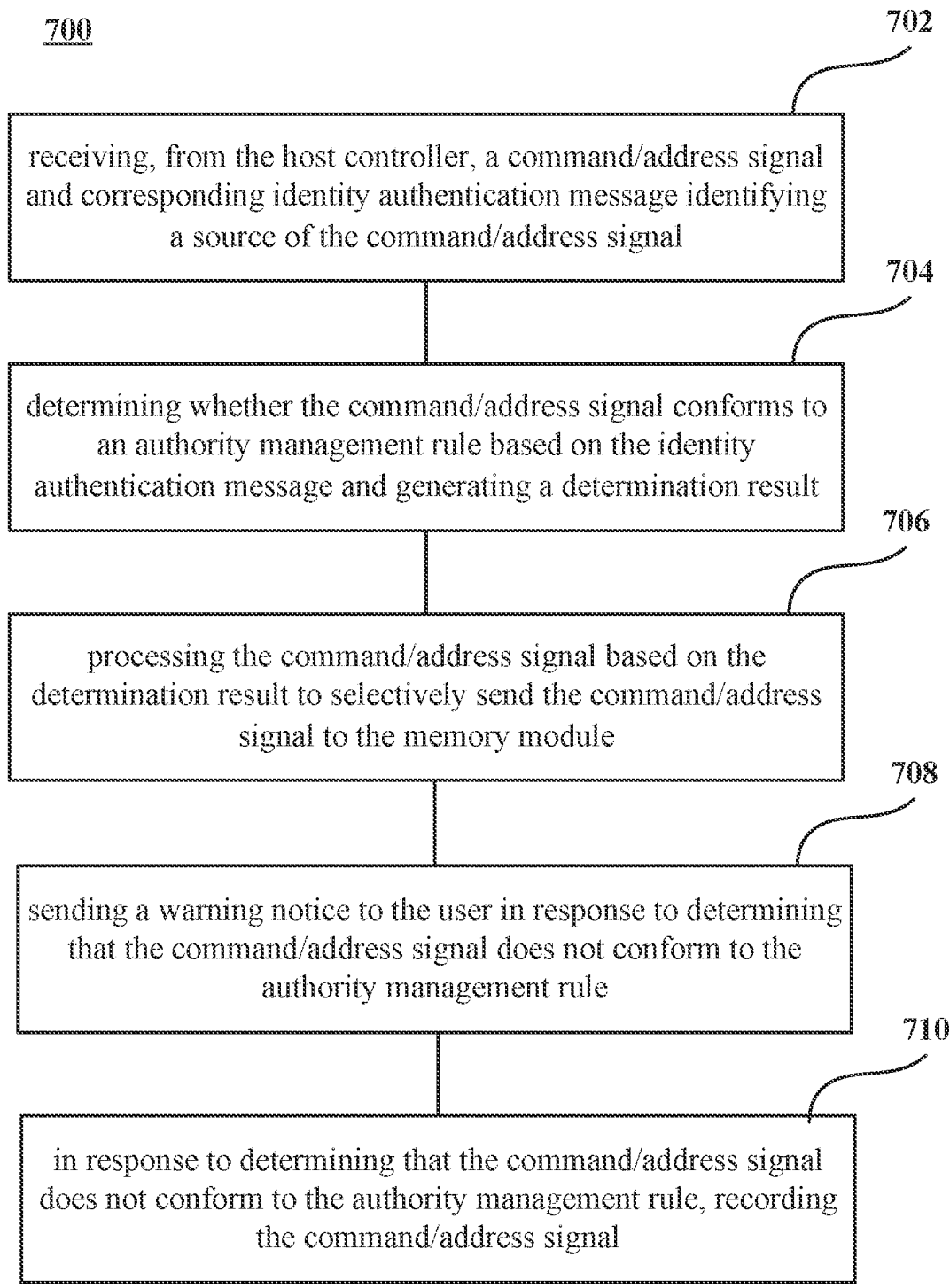
FIG. 7 illustrates a method for monitoring access to a memory module according to an embodiment of the present application.

FIG. 7 illustrates a method 700 for controlling access of a host controller to a memory module according to an embodiment of the present application. The method 700 may be executed by, for example, the central buffers 200 to 600 as illustrated in FIG. 2 to FIG. 6.

As illustrated in FIG. 7, the method 700 may include a step 702: receiving, from the host controller, a command/address signal and corresponding identity authentication message identifying a source of the command/address signal; a step 704: determining whether the command/address signal conforms to an authority management rule based on the identity authentication message and generating a determination result, and a step 706: processing the command/address signal based on the determination result to selectively send the command/address signal to the memory module.

In some embodiments, see Table 1 to Table 3 as described above, the authority management rule comprises the access command type allowed for each identity authentication message and/or the access address range of the memory module allowed for each identity authentication message.

In some embodiments, based on the identity authentication message corresponding to the command/address signal, the access command type allowed for such identity authentication message included in the authority management rule can be obtained. In such an embodiment, the step 704 may include comparing the access command included in the command/address signal with the allowed access command type: in response to that the access command included in the command/address signal is consistent with the allowed access command type, determining that the command/address signal conforms to the authority management rule; in response to that the access command included in the command/address signal is inconsistent with the allowed access command type, determining that the command/address signal does not conform to the authority management rule.

In some embodiments, based on the identity authentication message corresponding to the command/address signal, the access address range allowed for such identity authentication message included in the authority management rule can be obtained. In such an embodiment, the step 704 can include comparing the access address included in the command/address signal with the allowed access address range: in response to that the access address included in the command/address signal is within the allowed access address range, determining that the command/address signal conforms to the authority management rule; in response to that the access address included in the command/address signal is not within the allowed access address range, determining that the command/address signal does not conform to the authority management rule.

In some embodiments, based on the identity authentication message corresponding to the command/address signal, both the access address range and the access command type allowed for such identity authentication message included in the authority management rule can be obtained. In such an embodiment, the step 704 may include comparing the access address included in the command/address signal with the allowed access address range and comparing the access command included in the command/address signal with the allowed access command type: in response to that the access address included in the command/address signal is within the allowed access address range and that the access command included in the command/address signal is consistent with the allowed access command type, determining that the command/address signal conforms to the authority management rule; in response to that the access address included in the command/address signal is not within the allowed access address range or that the command signal included in the command/address signal is inconsistent with the allowed access command type, determining that the command/address signal does not conform to the authority management rule.

In some embodiments, the step 706 can include: in response to determining that the command/address signal conforms to the authority management rule, the command/address signal is provided to the memory module; in response to determining that the command/address signal does not conform to the authority management rule, the command/address signal is not provided to the memory module.

In some embodiments, the step 706 can include: in response to determining that the command/address signal conforms to the authority management rule, the command/address signal is provided to the memory module; in response to determining that the command/address signal does not conform to the authority management rule, the command/address signal is converted into an invalid signal.

In some embodiments, the step 706 can include: in response to determining the command/address signal conforms to the authority management rule, the command/address signal is provided to the memory module; and in response to determining that one or more command/address signals do not conform to the authority management rule, a number of the one or more command/address signals not conforming to the authority management rule is counted. In response to that the number of the one or more command/address signals not conforming to the authority management rule does not exceed a predetermined number, the one or more command/address signals not conforming to the authority management rule are provided to the storage module; and in response to that the number of the one or more command/address signals not conforming to the authority management rule exceeds the predetermined number, subsequent command/address signals that do not conform to the authority management rule are no longer provided to the memory module or converted into invalid signals.

Optionally, in some embodiments, the method 700 may further include a step 708: sending a warning notice to the user in response to determining that the command/address signal does not conform to the authority management rule.

Optionally, in some embodiments, the method 700 may further include a step 710: in response to determining that the command/address signal does not conform to the authority management rule, recording the command/address signal.

Figure 8:
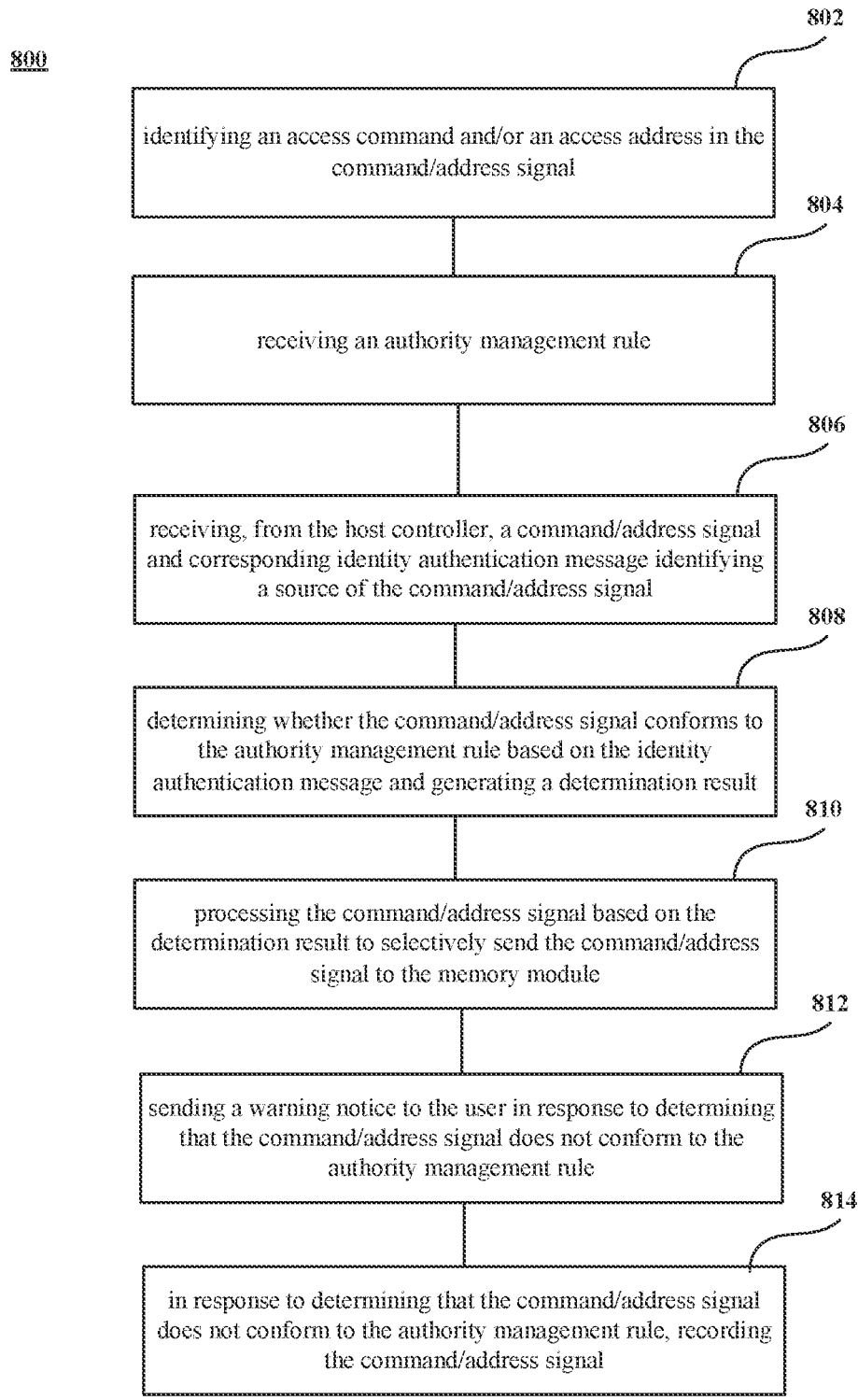
FIG. 8 illustrates a method for monitoring access to a memory module according to another embodiment of the present application.

FIG. 8 illustrates a method 800 for controlling access of a host controller to a memory module according to an embodiment of the present application. The method 800 can be executed by, for example, the central buffers 200 to 600 as illustrated in FIG. 2 to FIG. 6. The step 806 to step 814 are similar to the step 702 to step 710 as described in conjunction with FIG. 7 respectively, which will not be repeated herein.

The method 800 further includes a step 802, identifying an access command and/or an access address in the command/address signal. The method 800 can further include a step 804, receiving the authority management rule.

It should be noted that although several steps of the method for accessing the memory module and several modules or sub-modules of in the memory controller are mentioned in the above detailed description, such division is exemplary and not mandatory. Practically, according to the embodiments of the present application, the features and functions of two or more modules described above can be embodied in one module. In contrast, the features and functions of a module described above can be further divided into multiple modules to be embodied. In addition, the order of the steps described in the present application is not mandatory, and the order of execution can be modified according to actual needs.

Those skilled in the art can understand and implement other variations to the disclosed embodiments from a study of the specification, the disclosure and accompanying drawings, and the appended claims. In the claims, the word "comprising" does not exclude other elements or steps, and the indefinite article "a" or "an" does not exclude a plurality. In applications according to present application, one element may conduct functions of several technical feature recited in claims. Any reference numerals of the drawings in the claims should not be construed as limiting the scope.

What is claimed is:

1. A memory controller coupled between a memory module and a host controller to control access of the host controller to the memory module, wherein the memory controller comprises:
    a central buffer coupled between the host controller and the memory module, wherein the central buffer is configured to receive a command/address signal from the host controller via a command/address channel, and selectively provide the command/address signal to the memory module, and the central buffer is further configured to receive an identity authentication message identifying a source of the command/address signal from the host controller, wherein the central buffer comprises a main signal path and a branch signal path, wherein the main signal path is between a receiving side and an output side of the command/address channel, and the branch signal path is coupled to the main signal path through an access control module, wherein the central buffer comprises:
    a verification module, wherein the verification module is coupled in the branch signal path, and further coupled to the command/address channel to receive the command/address signal and the identity authentication message, and configured to determine whether the command/address signal conforms to an authority management rule based on the identity authentication message and generate a determination result; and
    the access control module, wherein the access control module is coupled in the main signal path and further coupled to the command/address channel to receive the command/address signal, and coupled to the verification module to receive the determination result generated by the verification module, wherein the access control module is configured to process the command/address signal based on the determination result generated by the verification module to selectively provide the command/address signal to the memory module.

2. The memory controller of claim 1, wherein the authority management rule comprises:
    an access command type allowed for the identity authentication message; and/or an access address range of the memory module allowed for the identity authentication message.

3. The memory controller of claim 2, wherein the verification module is further configured to:
    based on the identity authentication message corresponding to the command/address signal, acquire the access command type allowed for the identity authentication message from the authority management rule;
    compare an access command included in the command/address signal with the allowed access command type; and
    in response to that the access command included in the command/address signal is consistent with the allowed access command type, determine that the command/address signal conforms to the authority management rule; or
    in response to that the access command included in the command/address signal is inconsistent with the allowed access command type, determine that the command/address signal does not conform to the authority management rule.

4. The memory controller of claim 2, wherein the verification module is further configured to:
    based on the identity authentication message corresponding to the command/address signal, acquire the access address range allowed for the identity authentication message from the authority management rule;
    compare an access address included in the command/address signal with the allowed access address range;
    in response to that the access address included in the command/address signal is within the allowed access address range, determine that the command/address signal conforms to the authority management rule; or
    in response to that the access address included in the command/address signal is not within the allowed access address range, determine that the command/address signal does not conform to the authority management rule.

5. The memory controller of claim 2, wherein the verification module is further configured to:
    based on the identity authentication message corresponding to the command/address signal, acquire the access address range and the access command type allowed for the identity authentication message from the authority management rule;
    compare an access address included in the command/address signal with the allowed access address range;
    compare an access command included in the command/address signal with the allowed access command type; and in response to that the access address included in the command/address signal is within the allowed access address range and the access command included in the command/address signal is consistent with the allowed access command type, determine that the command/address signal conforms to the authority management rule; or in response to that the access address included in the command/address signal is not within the allowed access address range or the access command included in the command/address signal is inconsistent with the allowed access command type, determine that the command/address signal does not conform to the authority management rule.

6. The memory controller of claim 1, wherein the access control module is further configured to:
- in response to that the verification module determines that the command/address signal conforms to the authority management rule, provide the command/address signal to the memory module;
- in response to that the verification module determines that the command/address signal does not conform to the authority management rule, not provide the command/address signal to the memory module.

7. The memory controller of claim 1, wherein the access control module is further configured to:
- in response to that the verification module determines that the command/address signal conforms to the authority management rule, provide the command/address signal to the memory module;
- in response to that the verification module determines that the command/address signal does not conform to the authority management rule, convert the command/address signal into an invalid signal.

8. The memory controller of claim 1, wherein the access control module is further configured to:
- in response to that the verification module determines that the command/address signal conforms to the authority management rule, provide the command/address signal to the memory module;
- in response to that the verification module determines that one or more command/address signals do not conform to the authority management rule, count a number of the one or more command/address signals not conforming to the authority management rule:
  - in response to that the number of the one or more command/address signals not conforming to the authority management rule does not exceed a predetermined number, provide the one or more command/address signals not conforming to the authority management rule to the memory module; and
  - in response to that the number of the one or more command/address signals not conforming to the authority management rule exceeds the predetermined number, not provide subsequent command/address signals determined by the verification module as not conforming to the authority management rule to the memory module or converting the subsequent command/address signals determined by the verification module as not conforming to the authority management rule into invalid signals.

9. The memory controller of claim 1, wherein the verification module comprises:
- an identification module coupled to the command/address channel to receive the command/address signal and the identity authentication message, and the identification module being configured to identify an access command and/or an access address included in the command/address signal;
- a determination module coupled to the identification module to receive the access command and/or the access address included in the command/address signals and the identity authentication message, the determination module being configured to determine whether the command/address signal conforms to the authority management rule based on the corresponding identity authentication message; and
- a rule module configured to store the authority management rule, and the rule module being coupled to the determination module to provide the authority management rule to the determination module.

10. The memory controller of claim 9, wherein the verification module further comprises a configuration module coupled to the rule module, wherein the authority management rule can be configured in advance or dynamically via the configuration module.

11. The memory controller of claim 10, wherein the configuration module is further configured to receive configuration data from the host controller, so that the configuration module uses the configuration data to configure the authority management rule.

12. The memory controller of claim 1, wherein the verification module comprises:
- an identification module coupled to the command/address channel to receive the command/address signal and the identity authentication message, and the identification module being configured to identify an access command and/or an access address included in the command/address signal;
- a determination module coupled to the identification module to receive the access command and/or the access address included in the command/address signal and the identity authentication message, the determination module being configured to determine whether the command/address signal conforms to the authority management rule based on the corresponding identity authentication message; and
- an input channel coupled to the determination module, the input channel being configured to receive the authority management rule from the outside of the central buffer and provide the authority management rule to the determination module.

13. The memory controller of claim 1, wherein the central buffer further comprises an output channel and a warning module, the warning module being configured to send a warning notice to the user via the output channel in response to that the verification module determines that the command/address signal does not conform to the authority management rule.

14. The memory controller of claim 13, wherein the verification module comprises the warning module and the output channel.

15. The memory controller of claim 1, wherein the central buffer further comprises a recording module, in response to that the verification module determines that the command/address signal does not conform to the authority management rule, the recording module being configured to record the command/address signal.

16. The memory controller of claim 15, wherein the verification module comprises the recording module.

17. A method for controlling access to a memory module, wherein the method comprises:
- receiving, from a host controller, a command/address signal and a corresponding identity authentication message identifying a source of the command/address signal;
- determining, by a verification module, whether the command/address signal conforms to an authority management rule based on the identity authentication message and generating a determination result;
- processing, by an access control module, the command/address signal based on the determination result to selectively provide the command/address signal to the memory module,
- wherein the command/address signal is received from the host controller via a command/address channel, a central buffer is coupled between the host controller and the memory module, wherein the central buffer comprises a main signal path and a branch signal path, wherein the main signal path is between a receiving side and an output side of the command/address channel, and the branch signal path is coupled to the main signal path through the access control module, wherein the verification module is coupled in the branch signal path and the access control module is coupled in the main signal path.

18. The method of claim 17, wherein the authority management rule comprises:
- an access command type allowed for the identity authentication message; and/or an access address range of the memory module allowed for the identity authentication message.

19. The method of claim 18, wherein determining whether the corresponding command/address signal conforms to the authority management rule based on the identity authentication message and generating the determination result further comprises:
- based on the identity authentication message corresponding to the command/address signal, acquiring the access command type allowed for the corresponding identity authentication message from the authority management rule;
- comparing an access command included in the command/address signal with the allowed access command type; and
  - in response to that the access command included in the command/address signal is consistent with the allowed access command type, determining that the command/address signal conforms to the authority management rule; or
  - in response to that the access command included in the command/address signal is inconsistent with the allowed access command type, determining that the command/address signal does not conform to the authority management rule.

20. The method of claim 18, wherein determining whether the corresponding command/address signal conforms to the authority management rule based on the identity authentication message and generating the determination result further comprises:
- based on the identity authentication message corresponding to the command/address signal, acquiring the access address range allowed for the corresponding identity authentication message from the authority management rule;
- comparing an access address included in the command/address signal with the allowed access address range;
  - in response to that the access address included in the command/address signal is within the allowed access address range, determining that the command/address signal conforms to the authority management rule;
  - in response to that the access address included in the command/address signal is not within the allowed access address range, determining that the command/address signal does not conform to the authority management rule.

21. The method of claim 18, wherein determining whether the corresponding command/address signal conforms to the authority management rule based on the identity authentication message and generating the determination result further comprises:
- based on the identity authentication message corresponding to the command/address signal, acquiring the access address range and the access command type allowed the corresponding identity authentication message from the authority management rule;
- comparing an access address included in the command/address signal with the allowed access address range;
- comparing an access command included in the command/address signal with the allowed access command type; and
  - in response to that the access address included in the command/address signal is within the allowed access address range and the access command included in the command/address signal is consistent with the allowed access command type, determining that the command/address signal conforms to the authority management rule; or
  - in response to that the access address included in the command/address signal is not within the allowed access address range or the access command included in the command/address signal is inconsistent with the allowed access command type, determining that the command/address signal does not conform to the authority management rule.

22. The method of claim 17, wherein processing the command/address signal based on the determination result to selectively provide the command/address signal to the memory module comprises:
- in response to that the verification module determines that the command/address signal conforms to the authority management rule, providing the command/address signal to the memory module;
- in response to that the verification module determines that the command/address signal does not conform to the authority management rule, not providing the command/address signal to the memory module.

23. The method of claim 17, wherein processing the command/address signal based on the determination result to selectively provide the command/address signal to the memory module comprises:
- in response to that the verification module determines that the command/address signal conforms to the authority management rule, providing the command/address signal to the memory module;
- in response to that the verification module determines that the command/address signal does not conform to the authority management rule, converting the command/address signal into an invalid signal.

24. The method of claim 17, wherein processing the command/address signal based on the determination result to selectively provide the command/address signal to the memory module comprises:

in response to that the verification module determines that the command/address signal conforms to the authority management rule, providing the command/address signal to the memory module;

in response to that the verification module determines that one or more of command/address signals do not conform to the authority management rule, counting a number of the one or more command/address signals not conforming to the authority management rule:

in response to that the number of the one or more command/address signals not conforming to the authority management rule does not exceed a predetermined number, providing the one or more command/address signals not conforming to the authority management rule to the memory module; and in response to that the number of the one or more command/address signals not conforming to the authority management rule exceeds the predetermined number, not providing subsequent command/address signals determined by the verification module as not conforming to the authority management rule to the memory module or converting the subsequent command/address signals determined by the verification module as not conforming to the authority management rule into invalid signals.

25. The method of claim 18, wherein before determining whether the corresponding command/address signal conforms to the authority management rule based on the identity authentication message and generating the determination result, the method further comprises:

identifying an access command and/or an access address in the command/address signal; and receiving the authority management rule.

26. The method of claim 25, wherein the authority management rule can be configured in advance or dynamically.

27. The method of claim 26, wherein the method further comprises:

receiving configuration data from the host controller to configure the authority management rule with the configuration data.

28. The method of claim 17, wherein the method further comprises:

sending a warning notice to the user in response to determining that the command/address signal does not conform to the authority management rule.

29. The method of claim 17, wherein the method further comprises:

in response to determining that the command/address signal does not conform to the authority management rule, recording the command/address signal.

\* \* \* \* \*